(12) United States Patent
Nishizawa et al.

(10) Patent No.: US 7,024,850 B2
(45) Date of Patent: Apr. 11, 2006

(54) EXHAUST GAS PURIFYING CATALYST FOR INTERNAL COMBUSTION ENGINE

(75) Inventors: Toru Nishizawa, Yokohama (JP); Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/659,370

(22) Filed: Sep. 11, 2003

(65) Prior Publication Data

US 2004/0055280 A1   Mar. 25, 2004

(30) Foreign Application Priority Data

Sep. 25, 2002   (JP)   ............... 2002-278359

(51) Int. Cl.
*F01N 3/00*   (2006.01)
(52) U.S. Cl. .................. 60/277; 60/274; 60/276; 60/285; 60/295; 60/297
(58) Field of Classification Search ............... 60/274, 60/276, 277, 278, 280, 285, 284, 295, 297
See application file for complete search history.

(56) References Cited

U.S. PATENT DOCUMENTS 5,357,754 A * 10/1994 Ogawa et al. ............... 60/276
5,473,887 A   12/1995 Takeshima et al.
5,713,197 A *  2/1998 Ogawa et al. ............... 60/276
5,737,916 A *  4/1998 Mitsutani .................... 60/276
5,845,489 A   12/1998 Dohta et al.
6,003,309 A   12/1999 Agustin et al.
6,092,368 A *  7/2000 Ishii et al. ................... 60/277

FOREIGN PATENT DOCUMENTS

| DE | 199 46 628 A1 | 4/2001 |
| JP | 7-208151 A    | 8/1995 |
| JP | 2600492 B2    | 1/1997 |
| JP | 11-229849 A   | 8/1999 |

* cited by examiner

*Primary Examiner*—Binh Q. Tran
(74) *Attorney, Agent, or Firm*—Foley & Lardner LLP

(57) ABSTRACT

An exhaust gas purifying system for an internal combustion engine of an automotive vehicle. The exhaust gas purifying system includes an exhaust gas purifying catalyst disposed in an exhaust gas passage of the engine to remove an exhaust gas component. A concentration sensor is disposed in the exhaust gas passage downstream of the exhaust gas purifying catalyst to detect a concentration of the exhaust gas component. Additionally, a control unit is provided programmed to carry out (a) detecting an activity transition time at which the exhaust gas purifying catalyst changes from an inactive state to an active state, in accordance with the concentration of the exhaust gas component detected by the concentration sensor, and (b) judging a deterioration of the exhaust gas purifying catalyst at the activity transition time.

9 Claims, 13 Drawing Sheets

DPF EXHAUST GAS PRESSURE THRESHOLD VALUE

TARGET INTAKE AIR AMOUNT FOR ENGINE OPERATION ($\lambda=1$)

TARGET INTAKE AIR AMOUNT FOR PREVENTING DPF MELTING DAMAGE

TARGET VALUE λ REQUIRED DURING REGENERATION

EXHAUST GAS PURIFYING CATALYST FOR INTERNAL COMBUSTION ENGINE

BACKGROUND OF THE INVENTION

This invention relates to an exhaust gas purifying system including an exhaust gas purifying catalyst for purifying exhaust gas discharged from an internal combustion engine, and more particularly to a technique for judging and diagnosing a deterioration of the exhaust gas purifying catalyst.

It is well known that an adsorption-type NOx trap catalyst is used as an exhaust gas purifying catalyst in an exhaust gas purifying system for an automotive internal combustion engine. A technique for judging a deterioration of the adsorption-type NOx trap catalyst is disclosed in Japanese Patent Provisional Publication Nos. 07-208151 and 11-229849.

In Japanese Patent Provisional Publication No. 07-208151, the technique is proposed as follows: A NOx sensor for detecting a NOx concentration is disposed in an exhaust gas passage downstream of an adsorption-type NOx trap catalyst in order to grasp the deterioration of the NOx trap catalyst which adsorbs NOx in an oxidation atmosphere and releases NOx in a reduction atmosphere. The NOx sensor detects the NOx concentration in the oxidation atmosphere formed after NOx is released in the reduction atmosphere, and then the deterioration of the NOx trap catalyst is judged in accordance with a change of the detected NOx concentration with lapse of time.

In Japanese Patent Provisional Publication No. 11-229849, the technique is proposed as follows: A NOx sensor for detecting a NOx concentration is disposed in an exhaust gas passage downstream of a NOx trap catalyst in order to grasp the deterioration of the NOx trap catalyst which adsorbs NOx in an oxidation atmosphere and releases NOx in a reduction atmosphere. A deterioration of NOx trap catalyst is judged in accordance with an output of the NOx sensor at a time when ambient atmosphere is regulated to a reduction atmosphere under the action of an ambient atmosphere regulating means.

SUMMARY OF THE INVENTION

In the Japanese Patent Provisional Publication No. 07-208151, the NOx sensor is disposed downstream of the NOx trap catalyst. After NOx is released from the NOx trap catalyst in the reduction atmosphere, the NOx concentration is detected in the oxidation atmosphere. The deterioration of the NOx trap catalyst is judged in accordance with the change of the detected NOx concentration with lapse of time. When the NOx trap catalyst is saturated with NOx, the NOx concentration in exhaust gas downstream of the NOx trap catalyst increases in which a rising rate of the NOx concentration becomes large as the deterioration of the NOx trap catalyst progresses, on which an attention is paid in this Publication. However, the NOx concentration in exhaust gas discharged from the NOx trap catalyst in a warmed-up condition (i.e., the NOx concentration downstream of the NOx trap catalyst) changes within a low concentration range of, for example, not higher than about 10 ppm until the NOx trap catalyst approaches a saturated condition. Accordingly, in order to judge the deterioration of the NOx trap catalyst in accordance with the change of the NOx concentration, it is required to accurately detect such a low NOx concentration as about 10 ppm, and therefore the deterioration of the NOx trap catalyst cannot be diagnosed by using a usual NOx sensor which is suitably used for an internal combustion engine and has a detection lower limit of, for example, about 50 ppm. In order to judge the deterioration of the NOx trap catalyst in accordance with the NOx concentration detected by such a usual NOx sensor, it is necessary to increase the NOx concentration to a level obtained, for example, around the saturated condition of the NOx trap catalyst. This unavoidably causes a large amount of NOx to be discharged to atmospheric air.

In Japanese Patent Provisional Publication No. 11-229849, an attention is paid on a temporary out-flow of NOx from the NOx trap catalyst to the downstream side of the NOx trap catalyst during releasing of NOx from the NOx trap catalyst in the reduction atmosphere. The amount of this temporary out-flow of NOx becomes large in proportion to the NOx adsorption capacity of the NOx trap catalyst. Accordingly, when the deterioration of the NOx trap catalyst progresses to decrease the NOx adsorption capacity, the amount of the temporary out-flow of NOx reduces. The amount of the temporary out-flow of NOx is large as compared with the amount of NOx downstream of the NOx trap catalyst in the oxidation atmosphere, so that this Publication is intended to judge the deterioration of the NOx trap catalyst in accordance with an output of the NOx sensor. However, this temporary out-flow of NOx is made for a very short time, and therefore it is impossible to accurately detect the deterioration of the NOx trap catalyst by using the above-mentioned usual NOx sensor.

Thus, in the above-mentioned conventional techniques in the Japanese Patent Provisional Publications Nos. 07-208151 and 11-229849, the deterioration of the NOx trap catalyst is diagnosed in accordance with NOx as an exhaust gas component to be removed. This strictly requires a high detection accuracy for the NOx sensor as a concentration detecting means, thereby making it difficult to judge the deterioration of the NOx trap catalyst or unavoidably permitting a large amount of NOx to be emitted with execution of the judgment of deterioration of the NOx trap catalyst.

It is, therefore, an object of the present invention to provide an improved exhaust gas purifying system for an internal combustion engine, which can effectively overcome drawbacks encountered in conventional exhaust gas purifying systems for an internal combustion engine.

Another object of the present invention is to provide an improved exhaust gas purifying system for an internal combustion engine, in which a deterioration of an exhaust gas purifying catalyst can be readily judged without requiring an excessively high detection accuracy for concentration detecting means for an exhaust gas component to be removed.

A further object of the present invention is to provide an improved exhaust gas purifying system for an internal combustion engine provided with a NOx trap catalyst, in which a deterioration of the NOx trap catalyst can be readily judged without requiring a NOx sensor having an excessively high detection accuracy.

An aspect of the present invention resides in an exhaust gas purifying system for an internal combustion engine. The exhaust gas purifying system comprises an exhaust gas purifying catalyst disposed in an exhaust gas passage of the engine to remove an exhaust gas component. A concentration sensor is disposed in the exhaust gas passage downstream of the exhaust gas purifying catalyst to detect a concentration of the exhaust gas component. Additionally, a control unit is provided programmed to carry out (a) detecting an activity transition time at which the exhaust gas purifying catalyst changes from an inactive state to an active state, in accordance with the concentration of the exhaust gas component detected by the concentration sensor, and (b) judging a deterioration of the exhaust gas purifying catalyst at the activity transition time.

Another aspect of the present invention resides in an exhaust gas purifying system for an internal combustion engine. The exhaust gas purifying system comprises an exhaust gas purifying catalyst disposed in an exhaust gas passage of the engine to remove an exhaust gas component. The exhaust gas purifying catalyst is a NOx trap catalyst of a type wherein NOx is adsorbed in an oxidation atmosphere and released in a reduction atmosphere. A concentration sensor is disposed in the exhaust gas passage downstream of the exhaust gas purifying catalyst to detect a concentration of the exhaust gas component. The concentration sensor is a NOx sensor for detecting a concentration of NOx. Additionally, a control unit is provided programmed to carry out (a) detecting an activity transition time at which the exhaust gas purifying catalyst changes from an inactive state to an active state, in accordance with the concentration of the exhaust gas component detected by the concentration sensor, (b) judging a deterioration of the exhaust gas purifying catalyst at the activity transition time, (c) accomplishing a compulsory sulfur poisoning releasing processing for the NOx trap catalyst after an initial judgment of the deterioration of the NOx trap catalyst, (d) judging as to whether the NOx trap catalyst is subjected to a sulfur poisoning after a second judgment of the deterioration of the NOx trap catalyst and after the sulfur poisoning releasing processing, and (e) generating a warning when the NOx trap catalyst is judged not to be subjected to the sulfur poisoning.

A further aspect of the present invention resides in an exhaust gas purifying system for an internal combustion engine. The exhaust gas purifying system comprises an exhaust gas purifying catalyst disposed in an exhaust gas passage of the engine to remove an exhaust gas component. First means is provided for detecting a concentration of the exhaust gas component in the exhaust gas passage downstream of the exhaust gas purifying catalyst. Second means is provided for detecting an activity transition time at which the exhaust gas purifying catalyst changes from an inactive state to an active state, in accordance with the concentration of the exhaust gas component detected by the concentration detecting means. Additionally, third means is provided for judging a deterioration of the exhaust gas purifying catalyst at the activity transition time.

A still further aspect of the present invention resides in a method of purifying exhaust gas discharged from an internal combustion engine provided with an exhaust gas purifying catalyst disposed in an exhaust gas passage of the engine to remove an exhaust gas component. The exhaust gas purifying method comprises (a) detecting a concentration of the exhaust gas component in the exhaust gas passage downstream of the exhaust gas purifying catalyst; (b) detecting an activity transition time at which the exhaust gas purifying catalyst changes from an inactive state to an active state, in accordance with the detected concentration of the exhaust gas component; and (c) judging a deterioration of the exhaust gas purifying catalyst at the activity transition time.

BRIEF DESCRIPTION OF THE DRAWINGS

In the drawings, like reference numerals designate like elements and parts throughout all the figures, in which.

DETAILED DESCRIPTION OF THE INVENTION

Figure 1:
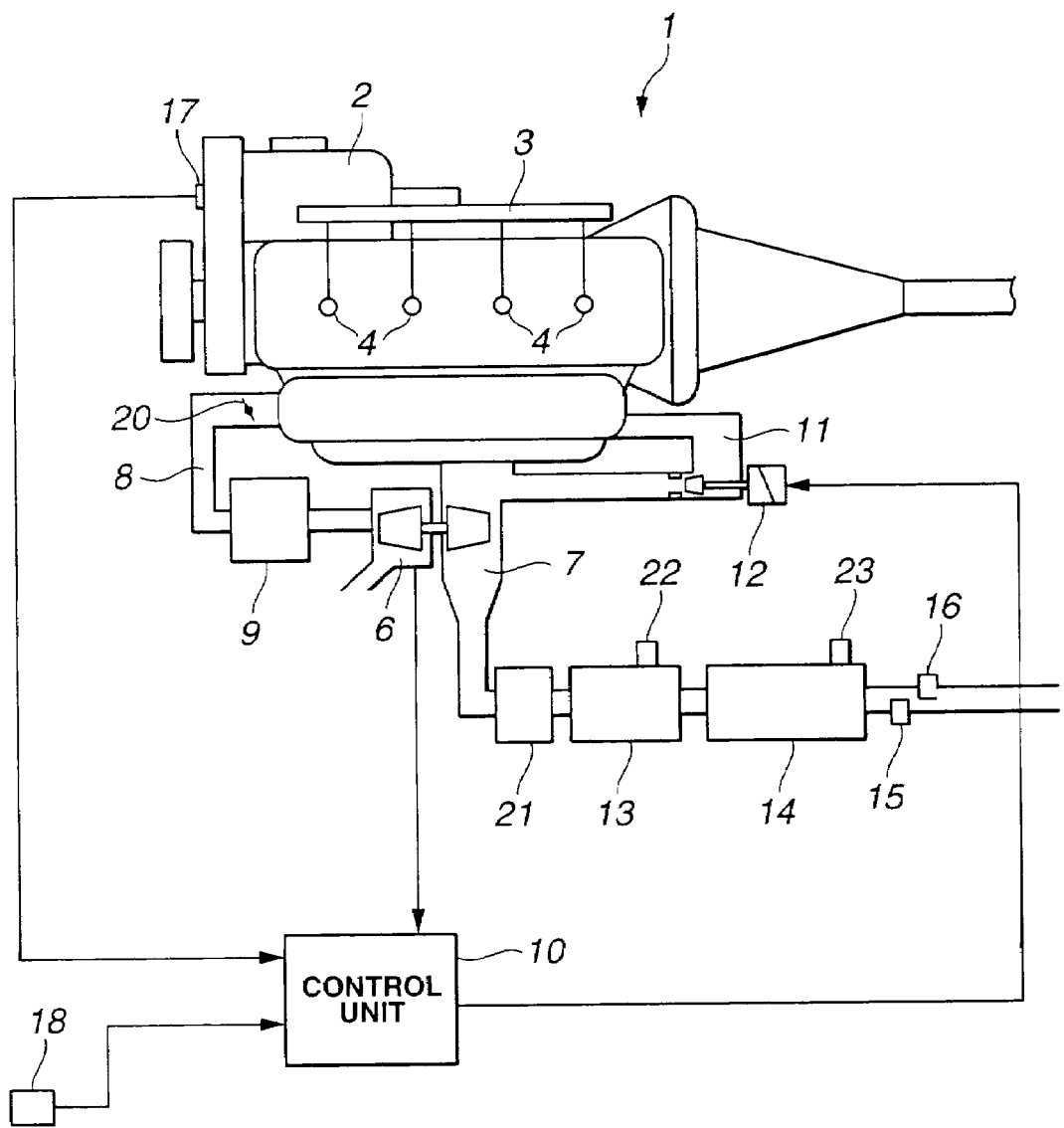
FIG. 1 is a schematic illustration of a diesel engine provided with a first embodiment of an exhaust gas purifying system according to the present invention.

Referring now to FIG. 1 of the drawings, a first embodiment of an exhaust gas purifying system is shown incorporated with a diesel engine 1. The diesel engine 1 is provided with a so-called common rail-type fuel injection system in which fuel pressurized to a certain pressure by a high pressure fuel pump 2 is introduced into a common rail 3 through which the pressurized fuel is supplied to fuel injector nozzles 4 for respective engine cylinders of the engine 1. Each of the fuel injector nozzles 4 is controllably opened to inject fuel and closed to stop injection of fuel, by control signals from a control unit 10, in which a fuel injection amount and a fuel injection timing are controllable for each of the engine cylinders. The fuel injection amount is an amount of fuel to be injected from the fuel injector nozzle 4. The fuel injection timing is a timing at which fuel is injected from the fuel injector nozzle 4. The control unit 10 is a digital computer including a ROM, a RAM, a CPU and input and output interfaces and functions to memorize and execute control processing as discussed after.

This diesel engine 1 is provided with a variable nozzle-type turbocharger 6 which includes a turbine wheel disposed in exhaust gas passage 7 and a compressor wheel disposed in intake air passage 8. Intercooler 9 is disposed in intake air passage 8 downstream of the compressor wheel. The nozzle opening of a variable nozzle of turbocharger 6 is controlled by control unit 10. The actual nozzle opening of the variable nozzle is detected by a sensor (not shown) which outputs a nozzle opening signal (representative of the actual nozzle opening) which is input to control unit 10.

This diesel engine 1 is further provided with an exhaust gas recirculation (EGR) system which includes EGR passage 11 connecting exhaust gas passage 7 and intake air passage 8. EGR valve 12 is disposed in EGR passage 11. Intake air control valve 20 is disposed in intake air passage 8. The opening degree of EGR valve 12 is controlled in accordance with an EGR valve control signal output from control unit 10. Similarly, the opening degree of intake air control valve 20 is controlled in accordance with a control signal (for intake air control valve 20) output from control unit 10.

Oxidation catalyst 21 is disposed in exhaust gas passage 7 downstream of the turbine wheel and carries noble metal as catalyst material for purifying exhaust gas. NOx trap catalyst 13 is disposed in exhaust gas passage 7 downstream of oxidation catalyst 21 and of the NOx adsorption-type wherein NOx is adsorbable to NOx trap catalyst 13. Particulate trap filter or DPF (diesel particulate filter) 14 is disposed in exhaust gas passage 7 downstream of NOx trap catalyst 13 so as to trap particulate matter in exhaust gas. These catalysts and filter are encased respectively in independent casings and arranged in series with each other so that exhaust gas flows through oxidation catalyst 21, NOx trap catalyst 13 and particulate trap filter 14 in this order.

NOx sensor 15 and air-fuel ratio sensor 16 are disposed in exhaust gas passage 7 downstream of NOx trap catalyst 13 and particulate trap filter 14. NOx sensor 15 is adapted to detect the concentration of NOx in exhaust gas. Air-fuel ratio sensor 16 is adapted to measure an air-fuel ratio or an excess air factor ($\lambda$) of exhaust gas.

In the first embodiment as shown in FIG. 1, a temperature sensor for directly detecting the temperature of NOx trap catalyst 13 is provided. Otherwise, temperature sensor 22 for NOx trap catalyst may be disposed at the downstream side of NOx trap catalyst 13 to detect the temperature of exhaust gas from which the temperature of NOx trap catalyst is estimated. Otherwise, a temperature sensor may be disposed at the upstream side of the NOx trap catalyst to detect the temperature of exhaust gas to be flown into NOx trap catalyst 13 from which the temperature of NOx trap catalyst 13 (or particulate trap filter 14) is estimated.

Figure 2:
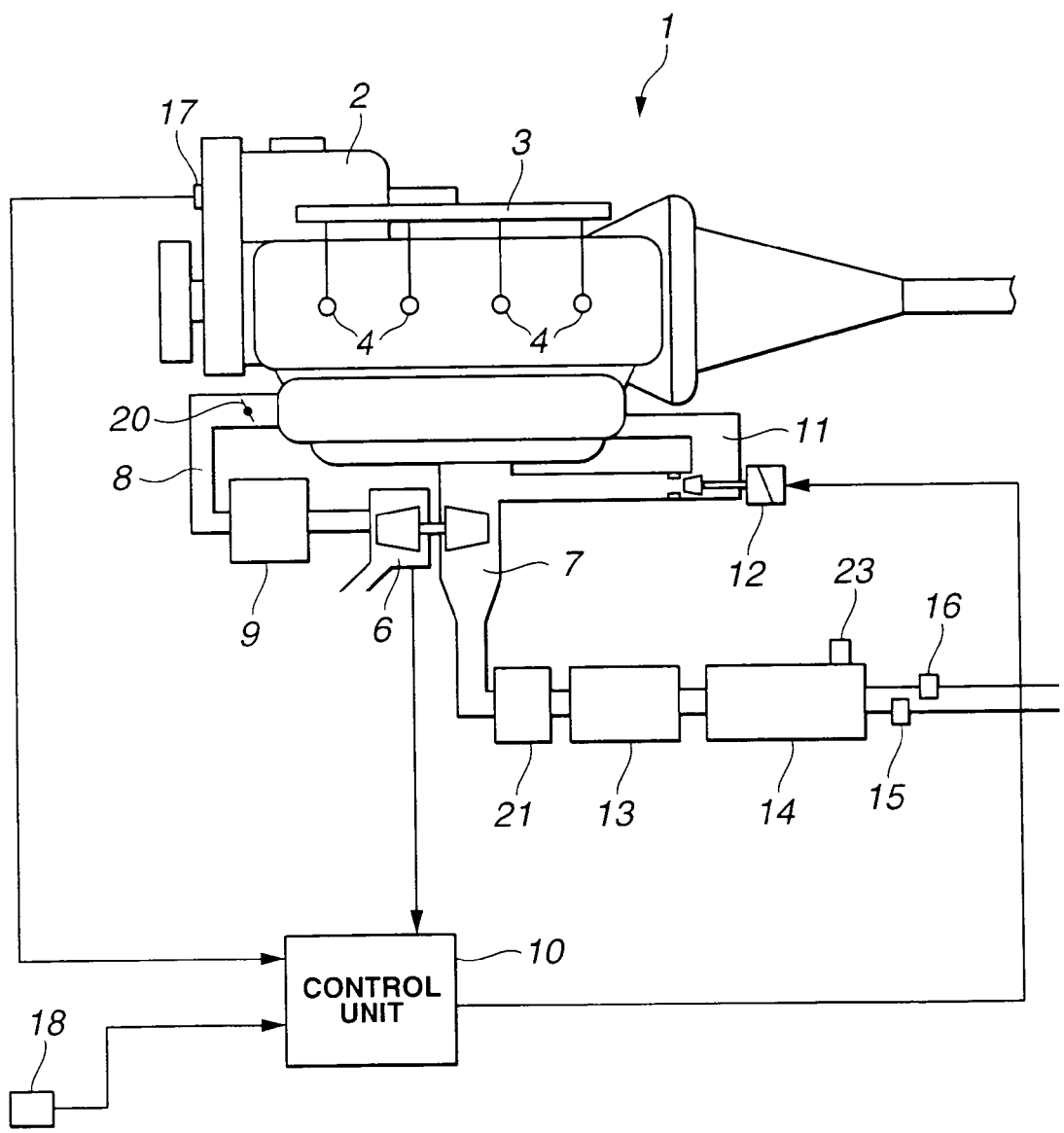
FIG. 2 is a schematic illustration of a diesel engine provided with a second embodiment of the exhaust gas purifying system according to the present invention.

In this regard, in a second embodiment of the exhaust gas purifying system shown in FIG. 2, temperature sensor 22 for NOx trap catalyst is omitted.

DPF temperature sensor 23 is disposed in particulate trap filter 14 to directly detect the temperature of the bed of the particulate trap filter 14. Diesel engine 1 is provided with crank angle sensor 17 and accelerator operation amount (or acceleration opening degree) sensor 18. Crank angle sensor 17 is adapted to detect a crank angle of a crankshaft of engine 1 as a basis of engine speed. Accelerator operation amount sensor 18 is adapted to detect an operation amount (opening degree) of an accelerator operated by a driver. Each of the above-mentioned various sensors outputs its detection signal which is input to control unit 10.

NOx trap catalyst 13 functions to trap NOx as an exhaust gas component to be removed when exhaust gas serves as an oxidation atmosphere in which air-fuel ratio of exhaust gas is lean, i.e., the excess air factor of exhaust gas is relatively large, and to release the trapped NOx when exhaust gas serves as a reduction atmosphere in which air-fuel ratio of exhaust gas is rich, i.e., the excess air factor of exhaust gas is relatively small. Additionally, NOx trap catalyst 13 functions to convert NOx to $NO_2$ thus changing harmful NOx to a harmless component. The oxidation atmosphere is formed when the engine is operated in a lean-burn mode. The reduction atmosphere is formed when the engine is operated on a rich air-fuel mixture, i.e., under a rich condition. It will be understood that a temporary compulsory operation for enriching the air-fuel ratio of exhaust gas is called "rich spike" by which NOx is released from NOx trap catalyst 13. This NOx releasing processing is called "NOx-regeneration" hereinafter. It has been known that the performance of NOx trap catalyst 13 is gradually lowered under gradual accumulation of sulfur component (or sulfur compound) contained in fuel to be supplied to the engine. Accordingly, a compulsory removal operation for the accumulated sulfur component is necessary at a suitable timing. This sulfur component removal processing is called "sulfur-poisoning releasing" or "SOx-regeneration".

Particulate matter of exhaust gas discharged from diesel engine 1 is basically trapped by particulate trap filter 14 and therefore is prevented from being emitted to the outside of the exhaust gas purifying system. The exhaust gas particulate matter accumulated in particulate trap filter 14 is partly naturally burnt under varying engine conditions; however, when the exhaust gas particulate matter is accumulated to a certain amount in particular trap filter 14, the temperature of exhaust gas is raised thereby compulsorily burning and removing the accumulated particulate matter. This processing is called "DPF regeneration" hereinafter.

Flow of a control for the exhaust gas purifying system including a processing of judgment and diagnosis for NOx trap catalyst 13 will be discussed with reference to flow-charts of FIGS. 3 to 12. The flow of the flowcharts is repeatedly executed every a predetermined time or computer computation cycle (for example, 10 ms).

Figure 3:
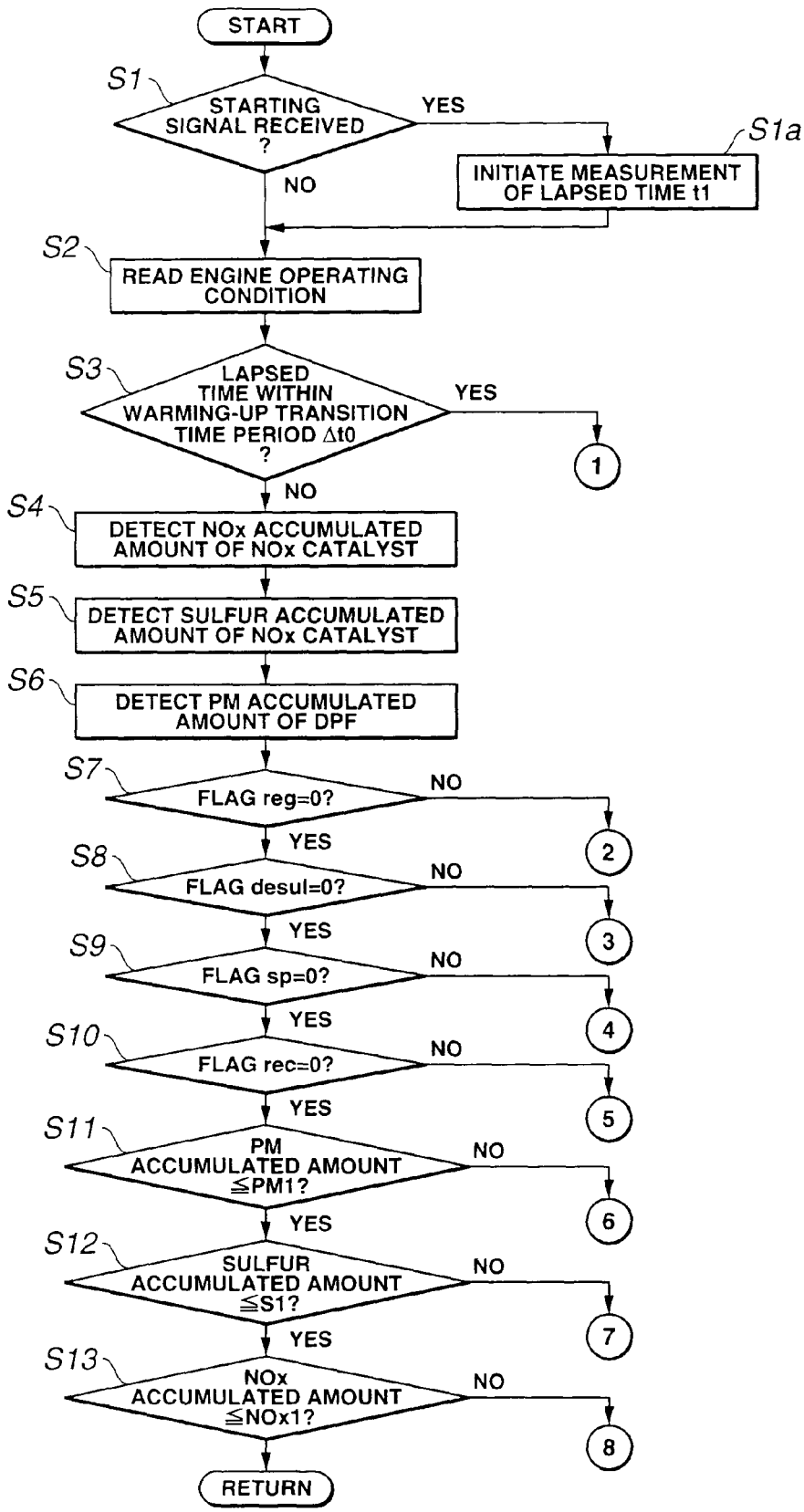
FIG. 3 is a main flowchart of a control for the exhaust gas purifying system of the first and second embodiments.

FIG. 3 is a main flowchart showing the whole flow of this control. At step S1, a judgment is made as to whether a starting signal corresponding to a requirement for initiating the starting of engine 1 is received or not. For example, the engine starting signal may be only the starting signal at an initial starting of the engine corresponding to operation of an ignition key. Otherwise, the engine starting signal may includes a starting signal at an automatic re-starting of the engine in addition to the above starting signal at the initial starting in case of a so-called idling stop vehicle which makes automatic stopping and automatic re-starting of the engine. When the starting signal is received, a flow goes to step S1a in which a measurement is initiated for a lapsed time t1 from a time of receiving the starting signal or engine starting. Specifically, a timer for counting the lapsed time t1 is reset.

At step S2, an operating condition of the engine is read in accordance with the detection signals of crank angle sensor 17, accelerator operation amount sensor 18 and the like.

At step S3, a judgment is made as to whether the above lapsed time t1 is within a previously set certain warming-up transition time period Δt0 or not. This warming-up transition time period Δt0 is immediately after the starting of the engine and corresponds to a time period for which the operating condition of the engine changes from a cold condition to a warmed-up condition. In other words, this warming-up transition time period Δt0 corresponds to a time period required for changing NOx trap catalyst 13 from its inactive state to its active state, and therefore is set, for example, as a very short time period of about 3 to about 60 seconds (not shorter than 3 seconds and not longer 60 seconds) from the time at which the engine starting signal is received.

Figure 4:
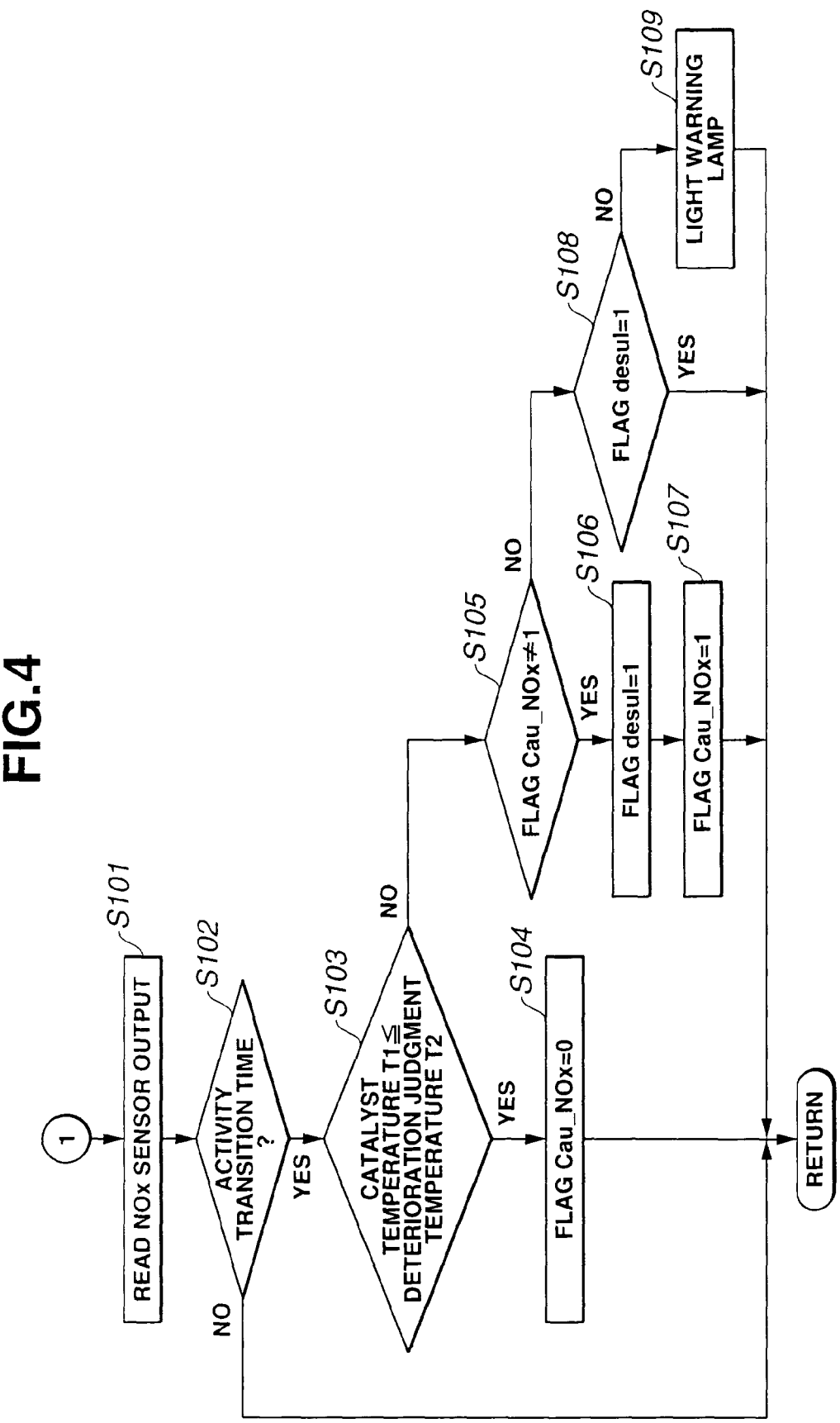
FIG. 4 is a flowchart of a routine of a deterioration judgment processing for a NOx trap catalyst in the exhaust gas purifying system of the first embodiment.
Figure 5:
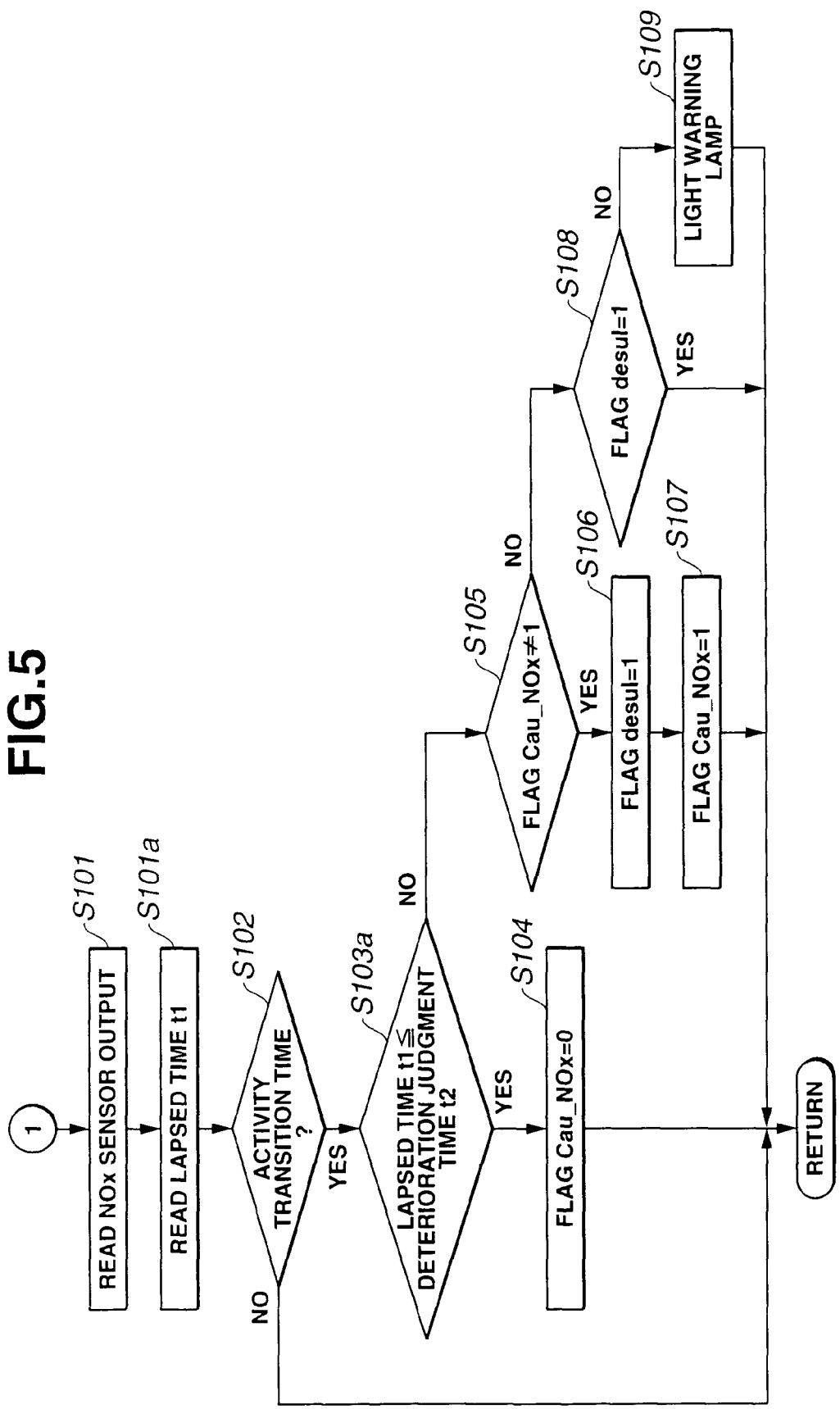
FIG. 5 is a flowchart of a routine for a deterioration judgment processing for a NOx trap catalyst in the exhaust gas purifying system of the second embodiment.

When the lapsed time t1 is judged to be within the warming-up transition time period Δt0 at step S3, the deterioration judgment and diagnosis processing for NOx trap catalyst 13 is carried out in a manner as shown in the flowcharts of FIGS. 4 and 5. In other words, the deterioration diagnosis is carried out only for the warming-up transition period Δt0, and therefore the deterioration diagnosis can be effectively accomplished for a short period of time. As a result, degradation of exhaust gas with the deterioration diagnosis can be suppressed to the minimum level while lightening a computation load of control unit 10.

When the lapsed time t1 is not within the warming-up transition time period Δt0 at step S3, the processing of the deterioration diagnosis as shown in the flowcharts of FIGS. 4 and 5 is not carried out, and therefore the processing of from step S4 as shown in the flowchart of FIG. 3 is executed. At step S4, the amount of NOx accumulated in NOx trap catalyst 13 is measured, for example, in a manner described in Japanese Patent No. 2600492 in which the amount of NOx adsorbed may be estimated from an accumulated value of engine speed, or obtained by adding an amount of NOx adsorbed every a vehicle travel of a certain distance or of a certain time.

At step S5, the amount of the sulfur component accumulated in NOx trap catalyst 13 is calculated. The manner of calculation of the sulfur component accumulated amount will be briefly discussed because it is not essential for the present invention. For example, similarly to the calculation manner of the NOx adsorbed amount described in the above Japanese Patent No. 2600492, the sulfur component accumulated amount is estimated from the accumulated value of engine speed of the engine. While NOx trap catalyst 13 has been shown and described as being disposed upstream of particulate trap filter 14 in this embodiment, it will be understood that NOx trap catalyst 13 may be disposed downstream of the particulate trap filter 14 providing no problem. Additionally, a NOx trap catalyst may be carried in particulate trap filter 14, providing another modification.

At step S6, the accumulated amount of exhaust gas particulate matter (which may be referred to as PM) in particulate trap filter 14 is detected. It is difficult to directly detect the particular matter accumulated amount in particulate trap filter 14, and therefore the particulate matter accumulated amount is estimated by monitoring an exhaust gas pressure in exhaust gas passage 7 upstream of particulate trap filter 14. It will be understood that the exhaust gas pressure rises as the accumulated amount of the exhaust gas particulate matter increases. Additionally, the accumulated amount of the exhaust gas particulate matter may be estimated by combining a vehicle travel distance and/or an accumulated value of engine speed from the previous DPF regeneration of particulate trap filter, and/or the above exhaust gas pressure.

At step S7, a judgment is made as to whether or not the present time is in a (DPF) regeneration mode in which the (DPF) regeneration of particulate trap filter 14 is carried out. When the present time is in the DPF regeneration mode, a flag reg is raised (flag reg=1) as discussed after, and therefore the flow goes to the processing of from step S201 in the flowchart of FIG. 6.

At step S8, a judgment is made as to whether or not the present time is in a sulfur poisoning releasing mode of NOx trap filter 13 in which mode the sulfur component is released from NOx trap catalyst 13. When the present time is in the sulfur poisoning releasing mode, a flag desul is raised as discussed after, and therefore the flow goes to the processing of from step S301 in the flowchart of FIG. 7.

At step S9, a judgment is made as to whether or not the present time is in a rich spike mode for the NOx-regeneration of NOx trap catalyst 13. When the present time is in the rich spike mode, a flag sp is raised as discussed after, and therefore the flow goes to the processing of from step S401 in the flowchart of FIG. 8.

Figure 9:
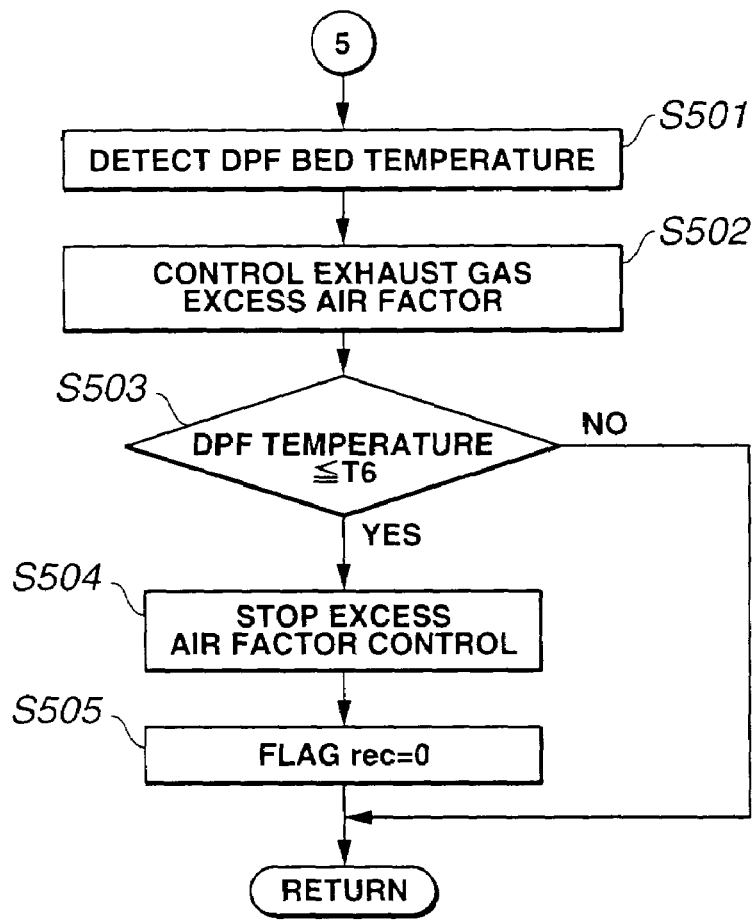
FIG. 9 is a flowchart of a routine for preventing a melting damage in the exhaust gas purifying system of the first and second embodiments.
Figure 10:
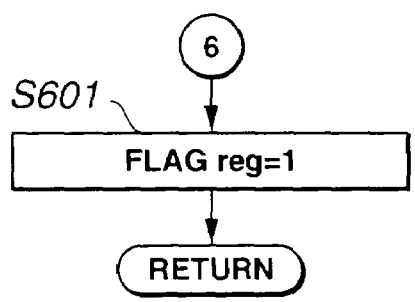
FIG. 10 is a flowchart of a routine for a processing of the DPF regeneration flag in the exhaust gas purifying system of the first and second embodiments.
Figure 11:
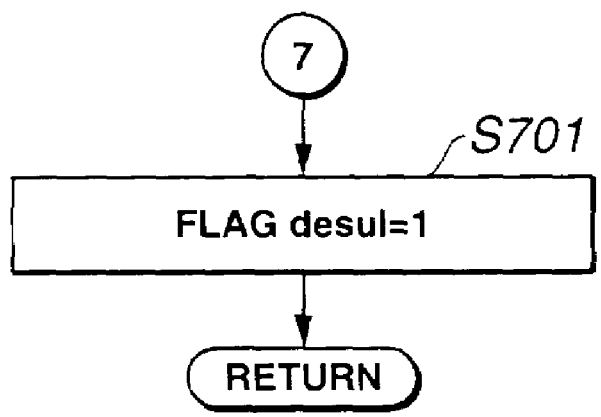
FIG. 11 is a flowchart of a routine for a processing of a sulfur poisoning releasing requirement flag in the exhaust gas purifying system of the first and second embodiments.
Figure 12:
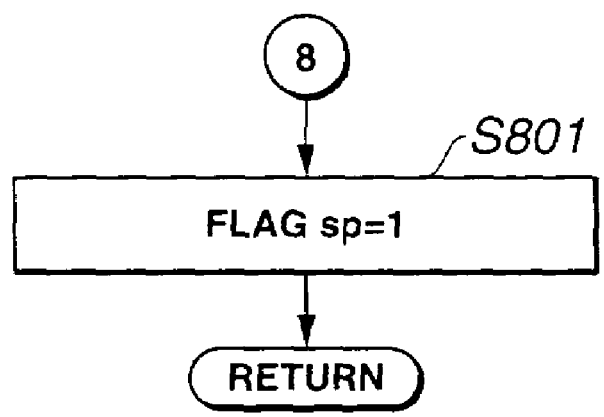
FIG. 12 is a flowchart of a routine for a processing of a NOx regeneration flag in the exhaust gas purifying system of the first and second embodiments.

At step S10, a judgment is made as to whether or not the present time is in a melting (or thermal) damage preventing mode during the DPF regeneration and/or the sulfur poisoning releasing. When the present time is in the melting damage preventing mode, a flag rec is raised, and therefore the flow goes to the processing of from step S501 as shown in the flowchart of FIG. 9.

Figure 6:
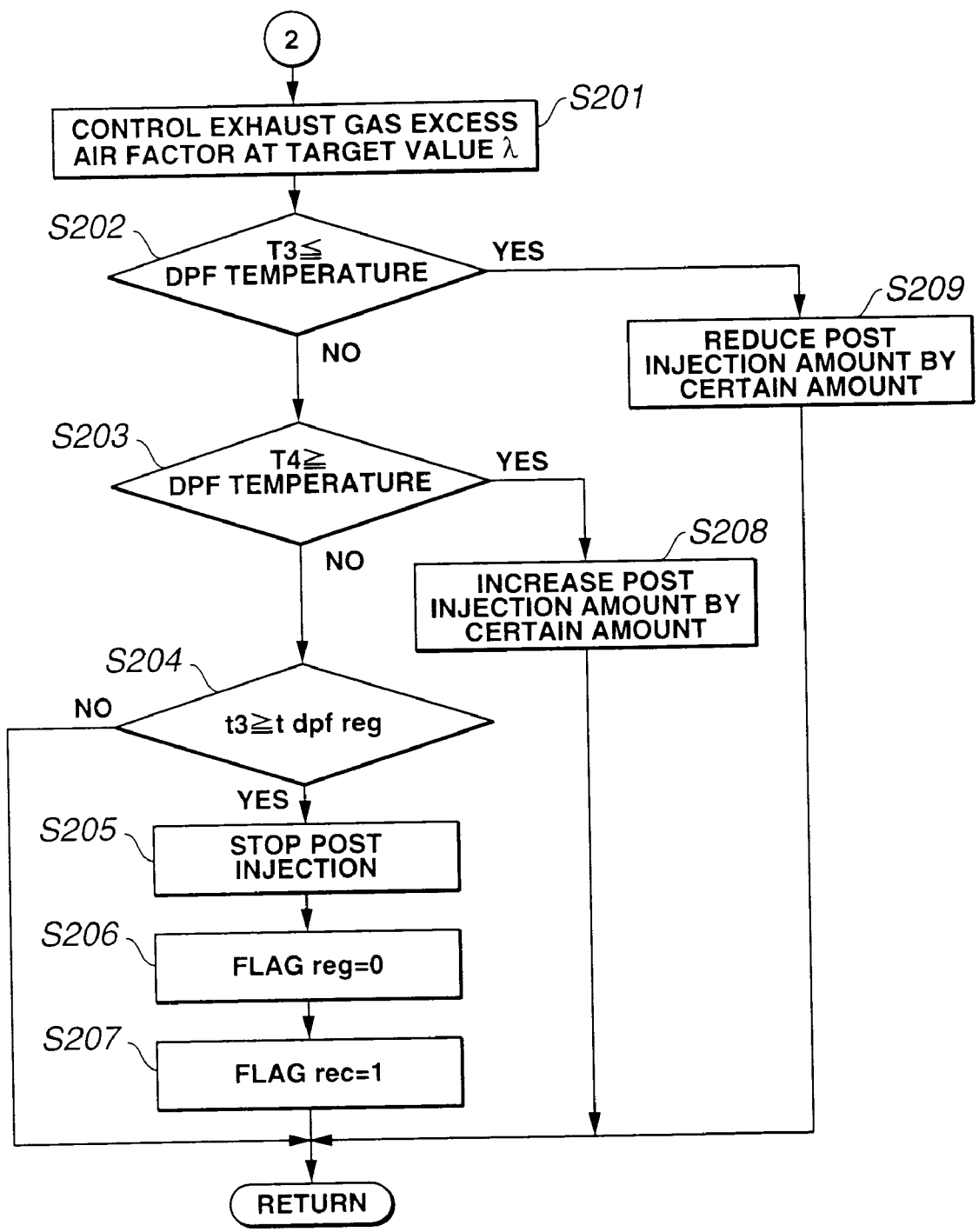
FIG. 6 is a flowchart of a routine for a DPF regeneration in the exhaust gas purifying system of the first and second embodiments.
Figure 13:
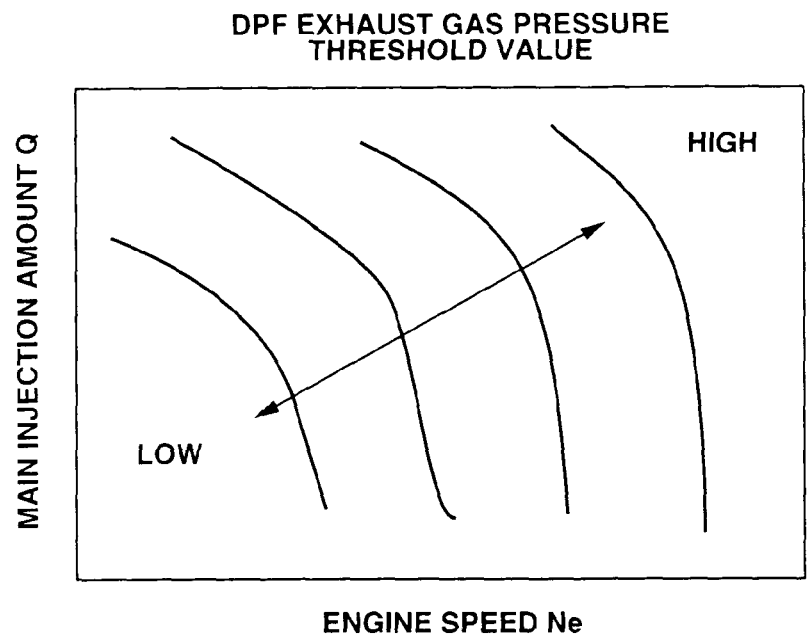
FIG. 13 is a characteristic graph of exhaust gas pressure threshold value for the DPF regeneration in the exhaust gas purifying system of the first and second embodiments.

At step S11, a regeneration time of particulate trap filter has come upon the amount of exhaust particulate matter accumulated in the particulate trap filter 14 reaching a certain level PM1. A judgment as to whether the accumulated amount of exhaust particulate matter has reached the level PM1 is made in accordance with an exhaust gas pressure in particulate tarp filter 14 in a certain engine operating condition. More specifically, a threshold value of the (DPF) exhaust gas pressure is read in accordance with engine operating conditions, from the characteristics shown in FIG. 13. When the exhaust gas pressure exceeds this threshold value, a decision of the regeneration time having come is made. In FIG. 13, an engine speed Ne of the engine is on the abscissa while a main fuel injection amount Q or engine load is on the ordinate. The main fuel injection amount is the amount of fuel injected from the fuel injector nozzle 4 as a main injection which is immediately before a post injection which will be discussed after. Otherwise, the decision of the regeneration time having come may be made when the vehicle travel distance from the previous DPF regeneration exceeds the certain level and when the exhaust gas pressure exceeds the threshold value. When the decision of the regeneration time having come is made, a DPF regeneration flag reg is set at 1 at step S601 in the flowchart of FIG. 10, and then a DPF regeneration processing as shown in the flowchart of FIG. 6 is immediately executed. More specifically, at the next time execution of this flow chart (for example, after 10 ms from the current execution), the decision at step S7 is denied, and the DPF regeneration processing is carried out.

At step S12, a judgment is made as to whether or not the amount of sulfur accumulated in NOx trap catalyst 13 has reached a certain level S1 so that a regeneration time of NOx trap catalyst 13 has come. More specifically, the sulfur accumulated amount per a certain time is obtained every the certain time from a map in which the sulfur accumulated amount per the certain time has been previously set and memorized in accordance with engine load (or the fuel injection amount) and engine speed of the engine. The thus obtained sulfur accumulated amounts are accumulated thereby to determine the sulfur accumulated amount of NOx trap catalyst 13. When the decision that the sulfur poisoning releasing is required is made upon the sulfur accumulated amount having reached the certain level S1, a sulfur poisoning releasing requirement flag desul is raised (flag desul=1) at step S701 in FIG. 11, and a sulfur poisoning releasing processing is immediately executed.

At step S13, a judgment is made as to whether or not the amount of NOx adsorbed in NOx trap catalyst 13 has reached a certain level NOx1 so that a regeneration time of NOx trap catalyst 13 has come. When the decision of requiring the NOx-regeneration is made upon the NOx adsorbed amount having reached a value of not less than the certain level NOx1, a NOx regeneration requirement flag sp is raised (flag sp=1) at step S801 in FIG. 12, and a processing for the NOx-regeneration is immediately executed.

FIGS. 4 and 5 show flows of a deterioration judgment processing for NOx trap catalyst 13. The flowchart of FIG. 4 corresponds to the first embodiment in which the deterioration of NOx trap catalyst 13 is judged in accordance with a temperature of NOx trap catalyst 13. The flowchart of FIG. 5 corresponds to the second embodiment in which the deterioration of NOx trap catalyst 13 is judged in accordance with a lapsed time of from a time of engine starting to a time at which NOx trap catalyst 13 has been activated.

First, with reference to the flowchart of FIG. 4, the deterioration judgment processing for NOx trap catalyst 13 in the first embodiment will be discussed in which the judgment of deterioration is carried out in accordance with the catalyst temperature. At step S101, an output of NOx sensor 15, i.e., a NOx concentration in exhaust gas passage 7 downstream of NOx trap catalyst 13 is read.

At step S102, an activity transition time at which NOx trap catalyst 13 changes from its inactive state to its active state is detected in accordance with the detection signal (representative of the detected NOx concentration) output from NOx sensor 15. For example, a time at which the detected NOx concentration of NOx sensor 15 changes from its state above a judgment concentration K1 to its state below the judgment concentration K1 is readily detected as the activity transition time. In case that the temperature of NOx trap catalyst 13 is low so that NOx trap catalyst 13 is in an inactive condition, for example, immediately after engine starting, the NOx concentration in the exhaust gas passage downstream of NOx trap catalyst 13 takes a large value such as not less than 60 ppm. When the temperature of NOx trap catalyst 13 rises so that NOx trap catalyst 13 becomes in an active state, the NOx concentration in the exhaust gas passage downstream of the catalyst is sharply lowered as compared with that in the inactive state of the catalyst and changes within a low concentration range, for example, of not higher than 10 ppm. A usual NOx sensor presently used for an internal combustion engine has a detection lower limit of about 50 ppm, and therefore the activity transition time at which NOx trap catalyst 13 shifts from its inactive state to the active state can be readily and precisely detected with such a usual NOx sensor by setting the above-mentioned judgment concentration K1, for example, at about 50 ppm.

When the judgment of the activity transition time having come is made at step S102, the flow goes to step S103 at which a judgment is made as to whether NOx trap catalyst has deteriorated or not in accordance with a temperature T1 of NOx trap catalyst 13 detected by temperature sensor 22 for NOx trap catalyst 13. More specifically, this catalyst temperature T1 is compared with a deterioration judgment temperature T2 which is the upper limit T2 of the catalyst temperature of NOx trap catalyst 13 at the activity transition time. The temperature of NOx trap catalyst 13 at the activity transition time tends to gradually rises with progress of the deterioration of NOx trap catalyst 13. Accordingly, when the catalyst temperature T1 is not higher than the upper limit (deterioration judgment temperature) T2, NOx trap catalyst 13 is judged not to have deteriorated, and therefore the flow goes to step S104 at which a flag Cau_NOx corresponding to a deterioration condition of NOx trap catalyst 13 is set at 0. When the catalyst temperature T1 is higher than the deterioration judgment temperature T2, NOx trap catalyst 13 is judged to have deteriorated, and therefore the flow goes to the processing of from step S105.

In the processing of step S105 to step S109, a judgment is made as to whether NOx trap catalyst 13 is in a deteriorated condition caused by sulfur poisoning, or in a malfunction condition caused by abnormality such as thermal deterioration or the like. In case of being in the malfunction condition caused by the thermal deterioration or the like, warning is to be made.

Figure 7:
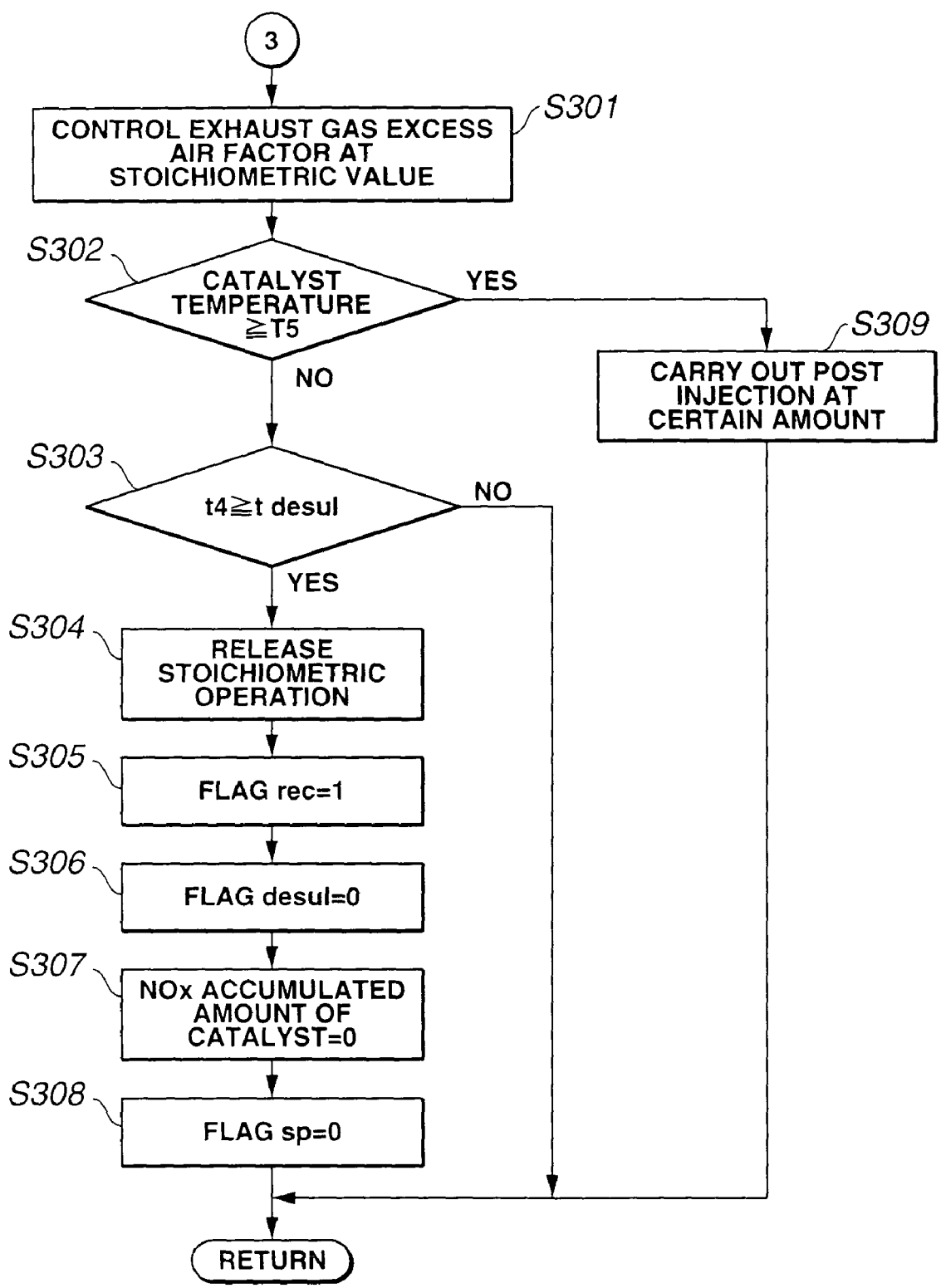
FIG. 7 is a flowchart of a routine for a sulfur poisoning releasing in the exhaust gas purifying system of the first and second embodiments.

At step S105, a confirmation is made as to whether the above deterioration flag Cau_NOx is set at 1 or not. In case that NOx trap catalyst 13 is firstly judged to have deteriorated at step S103, first the flow goes from step S105 to step S106 and step S107 at which the sulfur poisoning releasing requirement flag desul is set at 1 thereby issuing a releasing requirement for sulfur poisoning while setting the deterioration flag Cau_NOx at 1, because the deterioration flag Cau_NOx has been kept at 0 when the first or initial deterioration judgment is carried out. Accordingly, when the time has lapsed through the warming-up transition time period Δt0 after the first or initial deterioration judgment, denying is made at step S3 and denying is made at step S8 in the flowchart of FIG. 3, so that the sulfur poisoning releasing processing as shown in the flowchart of FIG. 7 is smoothly carried out. In other words, after the first or initial deterioration judgment, the sulfur poisoning releasing processing is compulsorily carried our regardless of the accumulated amount of the sulfur component. In case that NOx trap catalyst 13 is again judged to have deteriorated at the next engine starting, the flow goes from step S105 to step S108 at which a judgment is made as to whether the sulfur poisoning releasing requirement flag desul is set at 1 or not, because the deterioration flag Cau_NOx has been set at 1 after the first or initial judgment and when the second deterioration judgment is carried out. In other words, a judgment is made as to whether NOx trap catalyst 13 is subjected to the sulfur poisoning or not. This sulfur poisoning releasing requirement flag desul is set at 0 upon the sulfur poisoning releasing processing having been completed as shown in the flowchart of FIG. 7 as discussed after, and the flag desul is set at 1 when the accumulated amount of the sulfur component exceeds a certain level S1 (See step S12 and step S701 in FIG. 11). Accordingly, in case that the sulfur poisoning releasing flag desul is set at 0, it is judged that the deterioration of NOx trap catalyst 13 has put in the malfunction condition due to the abnormality such as thermal deterioration other than the sulfur poisoning, and therefore the flow goes to step S109 at which a warning lamp representing the deterioration of NOx trap catalyst 13 is lightened and indicated.

Next, with reference to the flowchart of FIG. 5, the deterioration judgment processing for NOx trap catalyst 13 in the second embodiment will be discussed in which the judgment of deterioration of NOx trap catalyst 13 is carried out in accordance with the lapsed time t1. In the second embodiment, the flow is similar to that of FIG. 4 except for addition of the processing of step S101a and replacement of step S103 with step S103a.

At step S101, the output of NOx sensor 15, i.e., the NOx concentration in exhaust gas passage 7 downstream of NOx trap catalyst 13 is read. At step S101a, the lapsed time from the time at which the starting signal corresponding to the engine starting is received is read. Specifically, this lapsed time is the value of the timer which has been reset at step S1a.

At step S102, the activity transition time at which NOx trap catalyst 13 changes from its inactive state to its active state is detected in accordance with the NOx concentration (on the downstream of the NOx trap catalyst) output from the NOx sensor 15. For example, the time at which the NOx concentration detected by NOx sensor 15 changes from its state above the judgment concentration K1 to its state below the judgment concentration K1 is detected as the above-mentioned activity transition time.

When the judgment of the activity transition time having come is made at S102, the flow goes to step S103a at which a judgment is made as to whether the lapsed time t1 from the time of initiation of the engine starting to the activity transition time is compared with a previously set certain deterioration judgment time t2. The lapsed time t1 of until the activity transition time tends to gradually extend as deterioration of NOx trap catalyst 13 progresses. Accordingly, if the lapsed time t1 becomes longer than the deterioration judgment time t2, it is judged that the deterioration of the catalyst has occurred. The deterioration judgment time t2 changes depending on a temperature increasing control and the like for the catalyst after the engine starting; however, such a change can be absorbed or offset by setting and regulating the deterioration judgment time t2 in each control or computer computation cycle.

The processing of from step S104 to step S109 is the same as that in the first embodiment, and therefore the explanation thereof is omitted for the purpose of simplicity of illustration.

The processing of the DPF regeneration (melting damage prevention) will be discussed with reference to FIG. 6.

Figure 15:
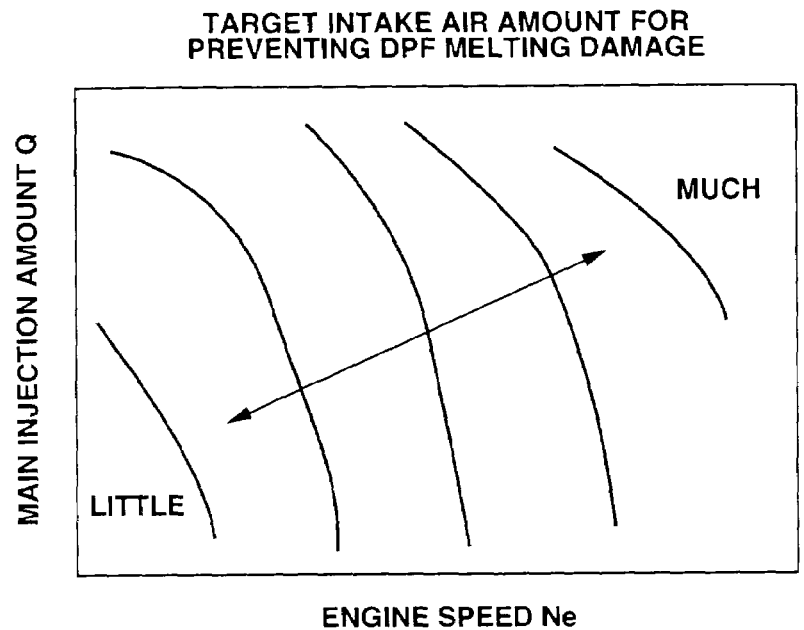
FIG. 15 is a characteristic graph of a target intake air amount required for preventing a DPF melting damage in the exhaust gas purifying system of the first and second embodiments.
Figure 16:
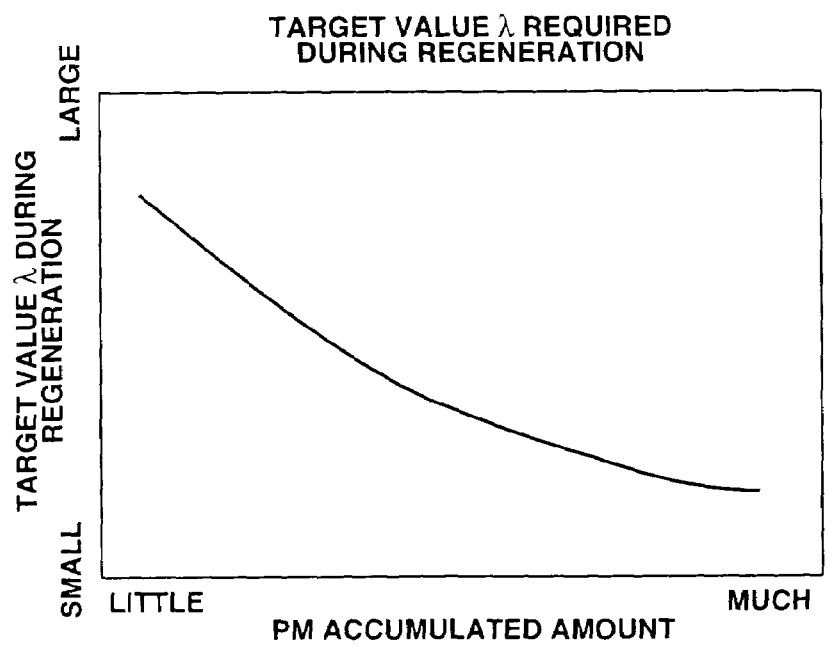
FIG. 16 is a characteristic graph of an excess air factor of exhaust gas required during the DPF regeneration in the exhaust gas purifying system of the first and second embodiments.

When the processing progresses to step S201, DPF 14 is in a temperature state in which burning of PM is possible. Accordingly, at this step S201, a target value λ of the excess air factor of exhaust gas is set in accordance with the accumulated amount of PM which is assumed to be accumulated in DPF 14, and a feedback control toward the target value λ is carried out in accordance with the detection signal from air-fuel ratio sensor 16. The excess air factor target value λ during the DPF regeneration is, for example, set with reference to a map shown in FIG. 16 and in accordance with the accumulated amount of PM. As shown in FIG. 16, the excess air factor target value λ is set to become larger as the accumulated amount of PM is smaller. Additionally, with reference to the map as shown in FIG. 15, a target intake air amount for preventing melting damage of DPF is set in accordance with the engine speed Ne and the main fuel injection amount Q, and the opening degrees of intake air control valve 20 and EGR valve 12 are controlled to obtain the target intake air amount. Even if the exhaust gas excess air factor is far from the target value λ in accordance with the target intake air amount, it can smoothly approach the target value λ under the effect of the above-mentioned feedback control by which the intake air control valve and the like are regulated.

Figure 17:
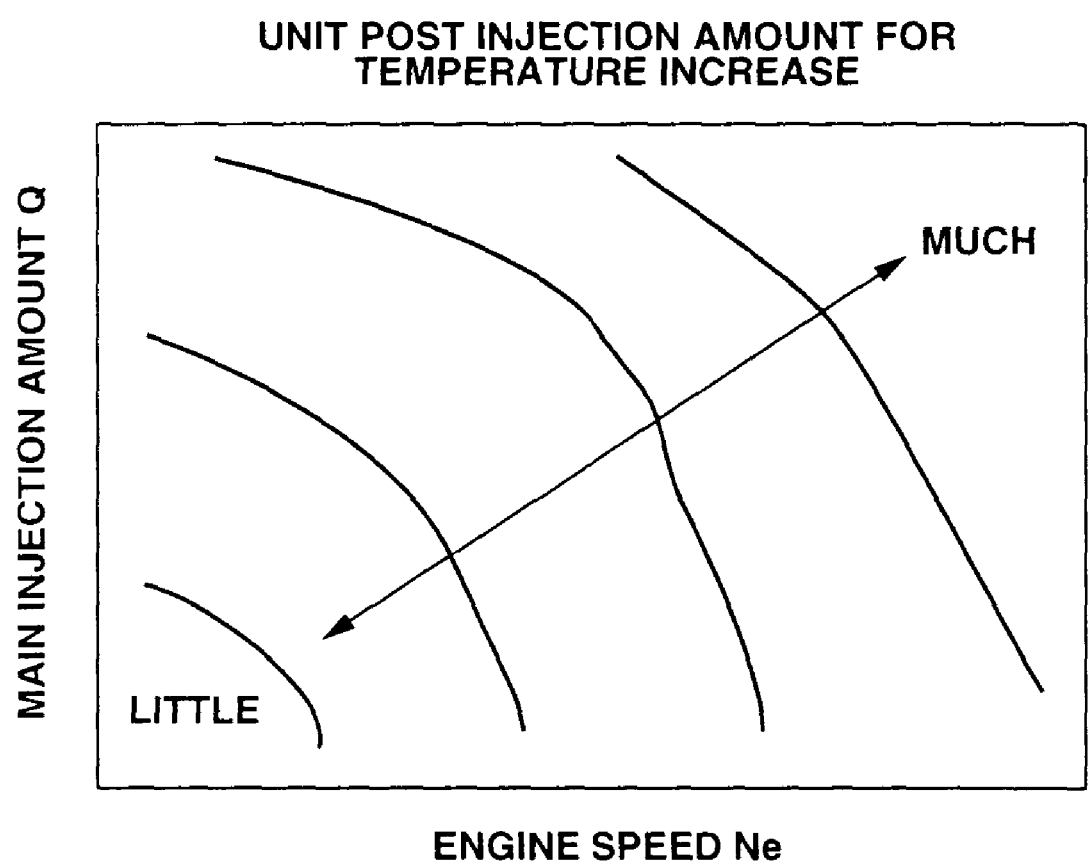
FIG. 17 is a characteristic graph of a unit post injection amount for temperature increase in the exhaust gas purifying system of the first and second embodiments.

Next, a post injection amount is regulated in order to maintain the temperature of DPF 14 detected by DPF temperature sensor 23 within a certain range (from T4 to T3). The post injection amount is a fuel injection amount in the post (fuel) injection which is made from the fuel injector nozzle 4 immediately after the above-mentioned main fuel injection in the same engine operational cycle. More specifically, when the DPF temperature is not lower than the target upper limit T3 during the DPF regeneration, the flow goes from step S202 to step S209 at which the post injection amount is reduced by a certain amount. When the DPF temperature is not higher than the target lower limit T4, the flow goes from step S203 to step S208 at which the post injection amount is increased by a certain amount. A unit post injection amount for temperature rising is set in accordance with the engine speed Ne and the main injection amount Q, for example, with reference to a map as shown in FIG. 17. Even if the exhaust gas excess air factor becomes far from the target value λ in accordance with the post injection amount, it can be smoothly approached to the target value λ under the above-mentioned feedback control in which the intake air control valve 20 and the like are regulated, thereby suppressing a change in temperature of the bed of DPF 14.

At step S204, a judgment is made as to whether a DPF regeneration processing time t3 in a condition where the temperature of DPF is maintained at the certain range (from T3 to T4) has lapsed by a previously set certain time t dpf reg. When the DPF regeneration processing time t3 has passed by the time t dpt reg, PM accumulated in DPF is securely burnt and removed, so that the DPF regeneration processing is assumed to be completed, followed by carrying out the processing at step S205 to step S207. At step S205, the post injection is stopped thereby stopping heating for DPF. At step S206, the flag reg is set at 0. At step S207, the flag reg is raised in order to establish the melting damage preventing mode. This is because if the excess air factor of exhaust gas is suddenly increased, there is the fear of DPF being subjected to melting damage under the fact that remaining PM may be momentarily burnt in DPF in case that PM remains unburned in DPF.

The processing of the sulfur poisoning releasing mode will be discussed with reference to the flowchart of FIG. 7.

Figure 14:
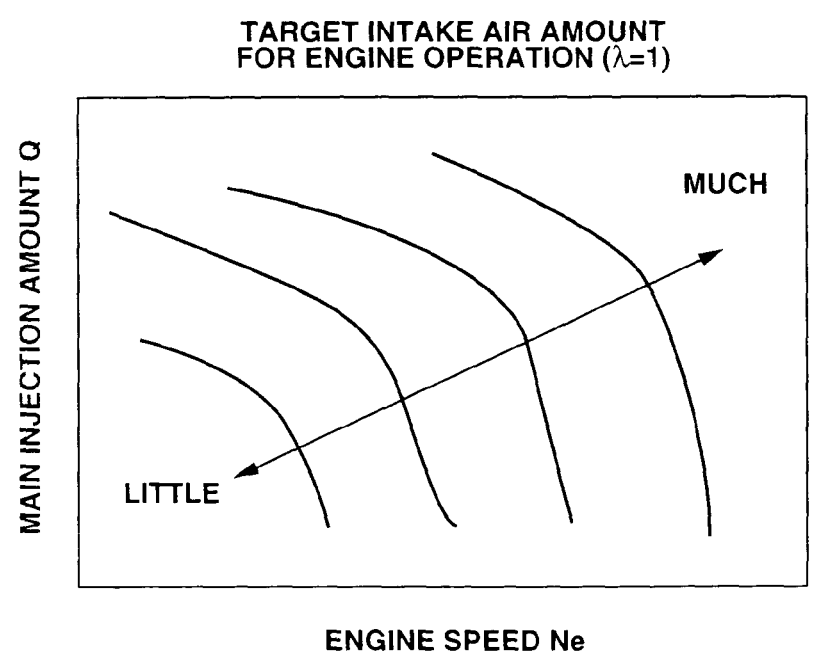
FIG. 14 is a characteristic graph of a target intake air amount required for an engine operation at λ=1 in the exhaust gas purifying system of the first and second embodiments.

At step S301, the target value λ of the exhaust gas excess air factor is set at a stoichiometric value (about 1) in order to decrease the sulfur component in NOx trap catalyst 13, and a feedback control toward the target value λ is carried out. For example, the excess air factor of exhaust gas is controlled by regulating the intake air amount under regulation of the opening degrees of intake air control valve 20 and EGR valve 12. A target intake air amount (target value of the intake air amount) for accomplishing an engine operation at the excess air factor of about 1 is set in accordance with the engine speed Ne and the main injection amount Q, for example, with reference to a map as shown in FIG. 14.

Subsequently, the fuel injection amount is controlled in a manner to maintain the temperature of NOx trap catalyst 13 at a level of not lower than a certain level T5. More specifically, when the temperature of NOx trap catalyst is lower than the certain level T5, the flow goes from step S302 to step S309 at which the post injection at a certain amount is carried out. Even if the exhaust gas excess air factor becomes far from the target value λ upon the post injection, the intake air amount is smoothly regulated under the feedback control, so that the exhaust gas excess air factor (λ) and the temperature of NOx trap catalyst bed are effectively maintained at the target values. For example, in case of using NOx trap catalyst 13 containing a Ba-based catalytic material, it is required to heat NOx trap catalyst 13 at 600° C. or higher in rich and stoichiometric air-fuel ratio atmospheres, so that the above-mentioned certain level T5 is set at 600° C. or higher.

At step S303, a judgment is made as to whether a lapsed time t4 of the sulfur poisoning releasing processing in which the temperature of NOx trap catalyst 13 is not lower than the certain level T5 (affirmation is made at step S302) lapses by a certain time t desul. When the certain time t desul has lapsed, the sulfur poisoning releasing processing is judged to have been completed, so that the processing of from step S304 to S308 is executed.

At step S304, the stoichiometric (air-fuel ratio) engine operation is released. At step S305, a flag rec is raised in order to establish the melting damage preventing mode. This is because if the excess air factor of exhaust gas is suddenly increased, there is the fear of DPF being subjected to melting damage under the fact that PM may be momentarily burnt in DPF. At step S306, flag desul is set at 0. At step S307, data of the sulfur accumulated amount in NOx trap catalyst 13 stored in RAM and the like in control unit 10 is reset at 0. By carrying out such a sulfur poisoning releasing processing, NOx trap catalyst 13 is subjected to the stoichiometric (air-fuel ratio) condition for a long time, and therefore the NOx-regeneration is substantially simultaneously carried out. At step S308, the flag sp is set at 0 thereby canceling the requirement of the NOx-regeneration.

Figure 8:
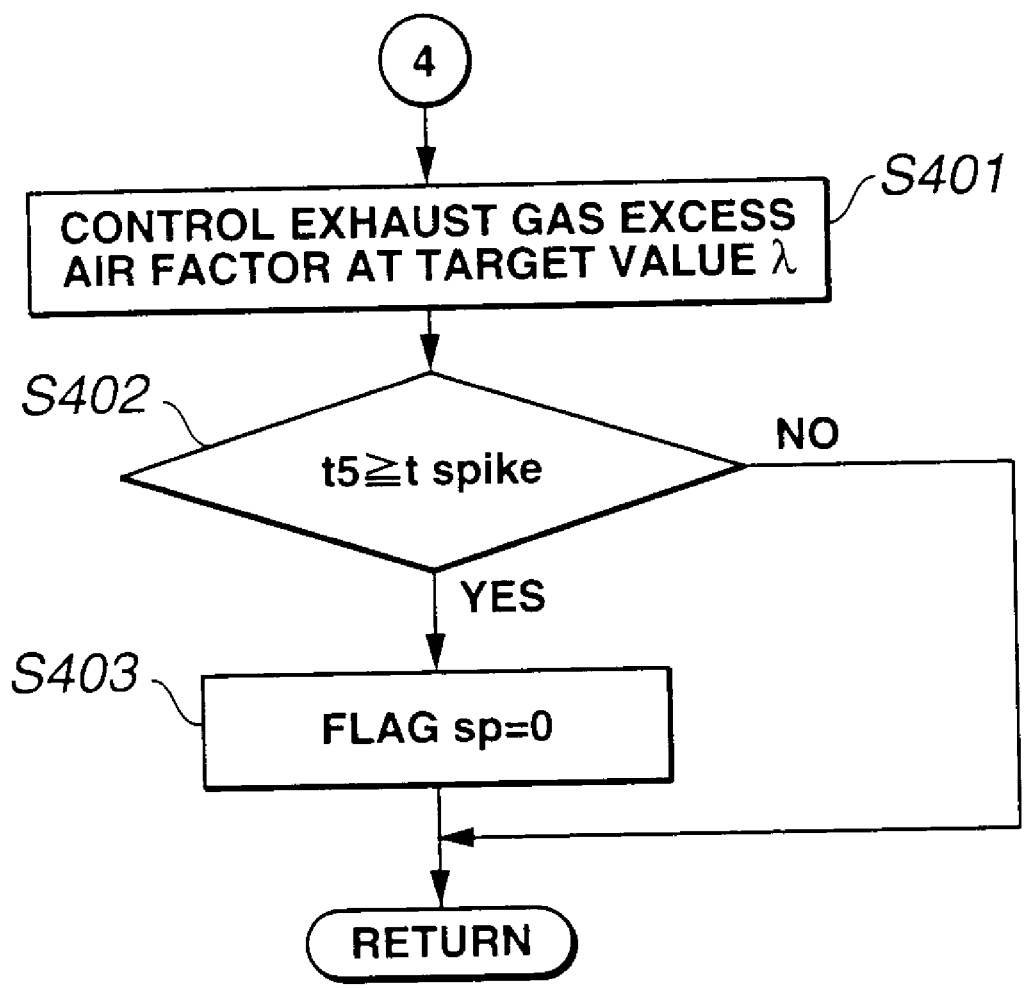
FIG. 8 is a flowchart of a routine for a rich spike operation in the exhaust gas purifying system of the first and second embodiments.

The processing of the rich spike will be discussed with reference to the flowchart of FIG. 8.

First, at step S401, the exhaust gas excess air factor is controlled at a target value (on the rich air-fuel ratio side) in order to establish a rich spike mode in which the rich spike is accomplished. More specifically, intake air control valve 20, turbocharger 6 and EGR valve 12 are controlled to obtain the target intake air amount corresponding to the target value λ. If such a rich (air-fuel ratio) condition continues by a certain time t spike, the flow goes from step S402 to step S403 at which the rich engine operation is released while setting the flag sp at 0 thereby terminating the rich spike mode.

The processing of the melting damage preventing mode will be discussed with reference to the flowchart of FIG. 9.

At step S501, the temperature of DPF 14 is detected. At step S502, the excess air factor of exhaust gas is controlled at a certain target value λ (for example, 1.4 or lower) in order to prevent PM remaining unburned and accumulating in DPF from momentarily burning thereby causing a melting damage of DPF, because the temperature of DPF is in a very high state in this melting damage preventing mode which is immediately after the DPF regeneration or a high load engine operation. More specifically, the amount of air to be sucked into an engine cylinder of the engine is controlled at the target intake air amount of the characteristics shown in FIG. 15, and additionally a feedback control is carried out in accordance with the output of air-fuel ratio sensor 16.

At step S503, a judgment is made as to whether or not the DPF temperature is lower than a temperature T6 at which there is the fear of PM initiating its prompt oxidation. When the DPF temperature is lower than T6, it is possible to avoid the melting damage of DPF even if the oxygen concentration becomes the same level as that of atmospheric air, so that the melting damage preventing processing is judged to have been completed. Accordingly, the flow goes to step S504 at which an excess air factor (λ) control is terminated. Then, at step S505, the flag rec is set at 0.

In the above embodiments, NOx sensor 15 is disposed as a concentration sensor for detecting a NOx concentration as an exhaust gas component to be removed, in the exhaust gas passage downstream of NOx trap catalyst 13 as an exhaust gas purifying catalyst. In accordance with the NOx concentration detected by this NOx censor 15, the activity transition time at which NOx trap catalyst 13 changes from its inactive state to its active state. The NOx concentration detected by NOx sensor 15 is largely different depending on the inactive state or active state, and therefore the above-mentioned activity transition time can be accurately detected even in case of using a usual NOx sensor which is relatively inexpensive and relatively low in detection accuracy so as to have a detection lower limit value of, for example, about 50 ppm.

At this activity transition time, deterioration of NOx trap catalyst 13 can be readily and accurately judged. For example, in the above-mentioned first embodiment, deterioration of NOx trap catalyst is judged by comparing the temperature T1 of NOx trap catalyst 13 with the certain deterioration judgment temperature T2. In the second embodiment, deterioration of NOx trap catalyst 13 is judged by comparing the lapsed time t1 from the engine starting to the activity transition time, with the certain deterioration judgment time t2.

After the initial or first time deterioration judgment in which the deterioration of NOx trap catalyst 13 is first judged to have occurred, the sulfur poisoning releasing processing is compulsorily carried out. Then, after the second deterioration judgment in which the deterioration of NOx trap catalyst 13 is again judged to have occurred, a judgment is made as to whether NOx trap catalyst 13 has been subjected to the sulfur poisoning. When not subjected to the sulfur poisoning, the warning is indicated. Accordingly, if the deterioration of NOx trap catalyst is caused by the sulfur poisoning, the sulfur poisoning can be smoothly released. If the deterioration is caused by the thermal deterioration or the like other than the sulfur poisoning, the warning is made to indicate this fact.

In many cases, the activity transition time is included in a certain time period immediately after the engine starting, more specifically, a very short time period from which the engine changes from its cold condition to its warmed-up condition. Accordingly, the above-mentioned judgment for deterioration of NOx trap catalyst 13 is carried out only during the warming-up transition time period in which the engine changes from its cold condition to its warmed-up condition. In other words, the deterioration judgment for NOx trap catalyst 13 is not carried out in time periods other than this warming-up transition time period, thereby shortening the time period in which the deterioration judgment is carried out while lightening the computing load of control unit 10.

While the present invention has been discussed with reference to the concrete modes of the embodiments, it will be appreciated that the present invention is not limited to the above embodiments and that various changes and modifications may be made in the invention, so that the present invention may be applied to a gasoline-fueled engine of the type wherein fuel is directly injected into an engine cylinder so as to make a lean-burn operation possible.

Hereinafter, the features of the exhaust gas purifying system according to the present invention obtained from the above embodiments are enumerated.

(1) The exhaust gas purifying system comprising an exhaust gas purifying catalyst disposed in an exhaust gas passage of the engine to remove an exhaust gas component. A concentration sensor is disposed in the exhaust gas passage downstream of the exhaust gas purifying catalyst to detect a concentration of the exhaust gas component. Additionally, a control unit is provided programmed to carry out (a) detecting an activity transition time at which the exhaust gas purifying catalyst changes from an inactive state to an active state, in accordance with the concentration of the exhaust gas component detected by the concentration sensor, and (b) judging a deterioration of the exhaust gas purifying catalyst at the activity transition time.

(2) The control unit is programmed to carry out the deterioration judging only immediately after a starting of the engine and during a warming-up transition time period in which the engine changes from a cold condition to a warmed-up condition.

(3) The control unit is programmed to carry out the activity transition time detecting in response to a time at which the concentration of the exhaust gas component changes from a state higher than a judgment concentration to a state lower than the judgment concentration.

(4) The control unit is programmed to carry out the deterioration judging in response to a condition in which a temperature of the exhaust gas purifying catalyst is higher than a judgment temperature at the activity transition time.

(5) The control unit is programmed to carry out the deterioration judging in response to a condition in which a lapsed time of from a time of starting of the engine to the activity transition time is longer than a judgment time.

(6) The exhaust gas purifying catalyst is a NOx trap catalyst of a type wherein NOx is adsorbed in an oxidation atmosphere and released in a reduction atmosphere, wherein the concentration sensor is a NOx sensor for detecting a concentration of NOx.

(7) The control unit is programmed to further carry out (c) a compulsory sulfur poisoning releasing processing for the NOx trap catalyst after an initial judgment of the deterioration of the NOx trap catalyst, (d) judging as to whether the NOx trap catalyst is subjected to a sulfur poisoning after a second judgment of the deterioration of the NOx trap catalyst and after the sulfur poisoning releasing processing, and (e) generating a warning when the NOx trap catalyst is judged not to be subjected to the sulfur poisoning.

The entire contents of Japanese Patent Application P2002-278359 (filed Sep. 25, 2002) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An exhaust gas purifying system for an internal combustion engine, comprising:
an exhaust gas purifying catalyst disposed in an exhaust gas passage of the engine to remove an exhaust gas component;
a concentration sensor disposed in the exhaust gas passage downstream of the exhaust gas purifying catalyst to detect a concentration of the exhaust gas component; and
a control unit programmed to carry out
detecting an activity transition time at which the exhaust gas purifying catalyst changes from an inactive state to an active state, based on the concentration of the exhaust gas component detected by the concentration sensor, and
judging a deterioration of the exhaust gas purifying catalyst at the activity transition time.

2. An exhaust gas purifying system as claimed in claim 1, wherein the control unit is programmed to carry out the deterioration judging only immediately after a starting of the engine and during a warming-up transition time period in which the engine changes from a cold condition to a warmed-up condition.

3. An exhaust gas purifying system as claimed in claim 1, wherein the control unit is programmed to carry out the activity transition time detecting in response to a time at which the concentration of the exhaust gas component changes from a state higher than a judgment concentration to a state lower than the judgment concentration.

4. An exhaust gas purifying system as claimed in claim 1, wherein the control unit is programmed to carry out the deterioration judging in response to a condition in which a temperature of the exhaust gas purifying catalyst is higher than a judgment temperature at the activity transition time.

5. An exhaust gas purifying system as claimed in claim 1, wherein the control unit is programmed to carry out the deterioration judging in response to a condition in which a lapsed time of from a time of starting of the engine to the activity transition time is longer than a judgment time.

6. An exhaust gas purifying system as claimed in claim 1, wherein the exhaust gas purifying catalyst is a NOx trap catalyst of a type wherein NOx is adsorbed in an oxidation atmosphere and released in a reduction atmosphere, wherein the concentration sensor is a NOx sensor for detecting a concentration of NOx.

7. An exhaust gas purifying system for an internal combustion engine, comprising:
an exhaust gas purifying catalyst disposed in an exhaust gas passage of the engine to remove an exhaust gas component, the exhaust gas purifying catalyst being a NOx trap catalyst of a type wherein NOx is adsorbed in an oxidation atmosphere and released in a reduction atmosphere;
a concentration sensor disposed in the exhaust gas passage downstream of the exhaust gas purifying catalyst to detect a concentration of the exhaust gas component, the concentration sensor being a NOx sensor for detecting a concentration of NOx; and
a control unit programmed to carry out
detecting an activity transition time at which the exhaust gas purifying catalyst changes from an inactive state to an active state, in accordance with the concentration of the exhaust gas component detected by the concentration sensor, and
judging a deterioration of the exhaust gas purifying catalyst at the activity transition time,
accomplishing a compulsory sulfur poisoning releasing processing for the NOx trap catalyst after an initial judgment of the deterioration of the NOx trap catalyst,
judging as to whether the NOx trap catalyst is subjected to a sulfur poisoning after a second judgment of the deterioration of the NOx trap catalyst and after the sulfur poisoning releasing processing, and
generating a warning when the NOx trap catalyst is judged not to be subjected to the sulfur poisoning.

8. An exhaust gas purifying system for an internal combustion engine, comprising:
an exhaust gas purifying catalyst disposed in an exhaust gas passage of the engine to remove an exhaust gas component;
means for detecting a concentration of the exhaust gas component in the exhaust gas passage downstream of the exhaust gas purifying catalyst;

means for detecting an activity transition time at which the exhaust gas purifying catalyst changes from an inactive state to an active state, based on the concentration of the exhaust gas component detected by the concentration detecting means; and means for judging a deterioration of the exhaust gas purifying catalyst at the activity transition time.

9. A method of purifying exhaust gas discharged from an internal combustion engine provided with an exhaust gas purifying catalyst disposed in an exhaust gas passage of the engine to remove an exhaust gas component, the exhaust gas purifying method comprising:

detecting a concentration of the exhaust gas component in the exhaust gas passage downstream of the exhaust gas purifying catalyst;

detecting an activity transition time at which the exhaust gas purifying catalyst changes from an inactive state to an active state, based on the detected concentration of the exhaust gas component; and judging a deterioration of the exhaust gas purifying catalyst at the activity transition time.

* * * * *